US008411150B2

(12) United States Patent
Yoshida

(10) Patent No.: US 8,411,150 B2
(45) Date of Patent: Apr. 2, 2013

(54) IMAGE PROCESSING APPARATUS, METHOD OF CONTROLLING THE SAME, AND STORAGE MEDIUM

(75) Inventor: Masashi Yoshida, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 12/680,706

(22) PCT Filed: Dec. 2, 2008

(86) PCT No.: PCT/JP2008/072218
§ 371 (c)(1),
(2), (4) Date: Mar. 29, 2010

(87) PCT Pub. No.: WO2009/078295
PCT Pub. Date: Jun. 25, 2009

(65) Prior Publication Data
US 2010/0214420 A1    Aug. 26, 2010

(30) Foreign Application Priority Data
Dec. 18, 2007    (JP) .................. 2007-326407

(51) Int. Cl.
*H04N 5/225* (2006.01)
(52) U.S. Cl. ............. 348/207.1; 348/207.2; 348/207.99; 348/207.11; 348/211.1; 348/552
(58) Field of Classification Search .............. 348/207.1, 348/207.99, 552, 207.2, 207.11, 333.01, 348/333.05
See application file for complete search history.

(56) References Cited

U.S. PATENT DOCUMENTS

| 5,852,680 | A | 12/1998 | Yoshida |
| 2003/0214679 | A1 | 11/2003 | Ishikawa |
| 2004/0223058 | A1* | 11/2004 | Richter et al. ............. 348/207.1 |
| 2004/0239765 | A1* | 12/2004 | Kuromatsu ................ 348/207.1 |
| 2005/0001902 | A1* | 1/2005 | Brogan et al. ............. 348/207.1 |
| 2007/0223056 | A1 | 9/2007 | Arimoto |

FOREIGN PATENT DOCUMENTS

| CN | 1574957 A | 2/2005 |
| JP | 2004-343421 A | 12/2004 |
| JP | 2004-356986 A | 12/2004 |
| JP | 2005-117362 A | 4/2005 |
| JP | 2005-159513 A | 6/2005 |
| JP | 2005167835 A | 6/2005 |
| JP | 2005-203865 A | 7/2005 |
| JP | 2005-252457 A | 9/2005 |
| JP | 2006-238018 A | 9/2006 |
| JP | 2006246023 A | 9/2006 |

OTHER PUBLICATIONS

Japanese Office Action issued on Jul. 24, 2012, concerning Japanese Patent Application No. 2007-326407.
Office Action dated Jan. 11, 2012 concerning Chinese Patent Application No. 200880121538.0.
European Search Report issued on Jun. 4, 2012 concerning EP Patent Application No. 08861238.7.

\* cited by examiner

Primary Examiner — Yogesh Aggarwal
(74) Attorney, Agent, or Firm — Fitzpatrick, Cella, Harper & Scinto

(57) ABSTRACT

In an apparatus, object information and information on a transmission destination representing the transmission destination of image data are registered in correspondence with each other. An object in the image data is identified. The image data is transmitted to a transmission destination represented by information on a transmission destination corresponding to identified object information. The transmission status of the image data by a transmission unit is displayed on a display unit together with the image data.

13 Claims, 11 Drawing Sheets

| REGISTERED NAME | WIRELESS PARAMETER | REGISTERED FACE DATA | |
|---|---|---|---|
| MR. / MS. A | Wireless Param1 | faceA | ~301 |
| MR. / MS. C | Wireless Param2 | faceA,faceB,faceC | ~302 |
| MR. / MS. E | Wireless Param3 | faceB,faceE | ~303 |
| MR. / MS. G | Wireless Param4 | faceD,faceG | ~304 |

| FACE DATA | NUMBER OF REGISTERED PARAMETERS | TRANSMISSION STATUS | |
|---|---|---|---|
| faceA | 2 (wp1,wp2) | 2 / 2 (wp1 = done,wp2 = done) | ~401 |
| faceB | 2 (wp2,wp3) | 1 / 2 (wp2 = done,wp3 = sending) | ~402 |
| faceD | 1 (wp4) | 0 / 1 (wp4 = unsent) | ~403 |
| faceF | 0 | 0 / 0 (unregistered) | ~404 |

400

IMAGE PROCESSING APPARATUS, METHOD OF CONTROLLING THE SAME, AND STORAGE MEDIUM

TECHNICAL FIELD

The present invention relates to a technique of transmitting image data from an image processing apparatus to another apparatus.

BACKGROUND ART

In recent years, digital cameras are becoming popular, and captured object image data are frequently transferred to another apparatus such as a personal computer (PC), another digital camera, or a printer.

Studies of a face recognition technique in an image capturing apparatus are also progressing. Japanese Patent Laid-Open No. 2005-252457 discloses an invention in which the face images of objects and pieces of information on image destinations are registered in association with each other. When a captured image matches registered information, the image is transmitted. Japanese Patent Laid-Open No. 2004-356986 discloses an invention in which person images and mail addresses are managed in correspondence with each other. When a captured image contains a registered person image, the image is transmitted to the corresponding mail address. These techniques associated with an image transmission technique using a face recognition technique in an image capturing apparatus are known.

In the above-described prior art, person images and pieces of information on image destinations are managed in association with each other. If a captured image contains a registered person image, the image can be transmitted to the corresponding transmission destination.

However, it is difficult to instantaneously determine, out of persons contained in a captured image, persons whose information on an image destination is already registered, persons to whom an image is already transmitted, and persons to whom an image is not yet transmitted.

In Japanese Patent Laid-Open No. 2005-252457, registered information on an image destination can be superimposed on a captured image and displayed. However, it is impossible to determine whether the captured image is already transmitted to the transmission destination.

DISCLOSURE OF INVENTION

The present invention is directed to overcome the above-described drawbacks and disadvantages.

According to an aspect of the present invention, there is provided an image processing apparatus comprising: a registration unit configured to register object information and information on a transmission destination representing a transmission destination of image data in correspondence with each other; an identification unit configured to identify an object based on a feature amount in a region representing the object in the image data; a transmission unit configured to transmit the image data to a transmission destination represented by information on a transmission destination corresponding to object information of the object identified by the identification unit; and a display control unit configured to display, on a display unit, a transmission status of the image data by the transmission unit together with the image data, the display control unit displaying the transmission status for each object identified by the identification unit.

According to another aspect of the present invention, there is provided a method of controlling an image processing apparatus, comprising the steps of: registering object information and information on a transmission destination representing a transmission destination of image data in correspondence with each other; identifying an object based on a feature amount in a region representing the object in the image data; transmitting the image data to a transmission destination represented by information on a transmission destination corresponding to object information of the identified object; and displaying, on a display unit, a transmission status of the image data together with the image data for each identified object.

Further features and aspects of the present invention will become apparent from the following description of exemplary embodiments with reference to the attached drawings.

BRIEF DESCRIPTION OF DRAWINGS

The accompanying drawings, which are incorporated in and constitute a part of the specification, illustrate exemplary embodiments, features and aspects of the present invention and, together with the description, serve to explain the principles of the present invention.

BEST MODE FOR CARRYING OUT THE INVENTION

Exemplary embodiments, features and aspects of the present invention will now be described in detail below with reference to the attached drawings.

<First Embodiment>

Figure 1:
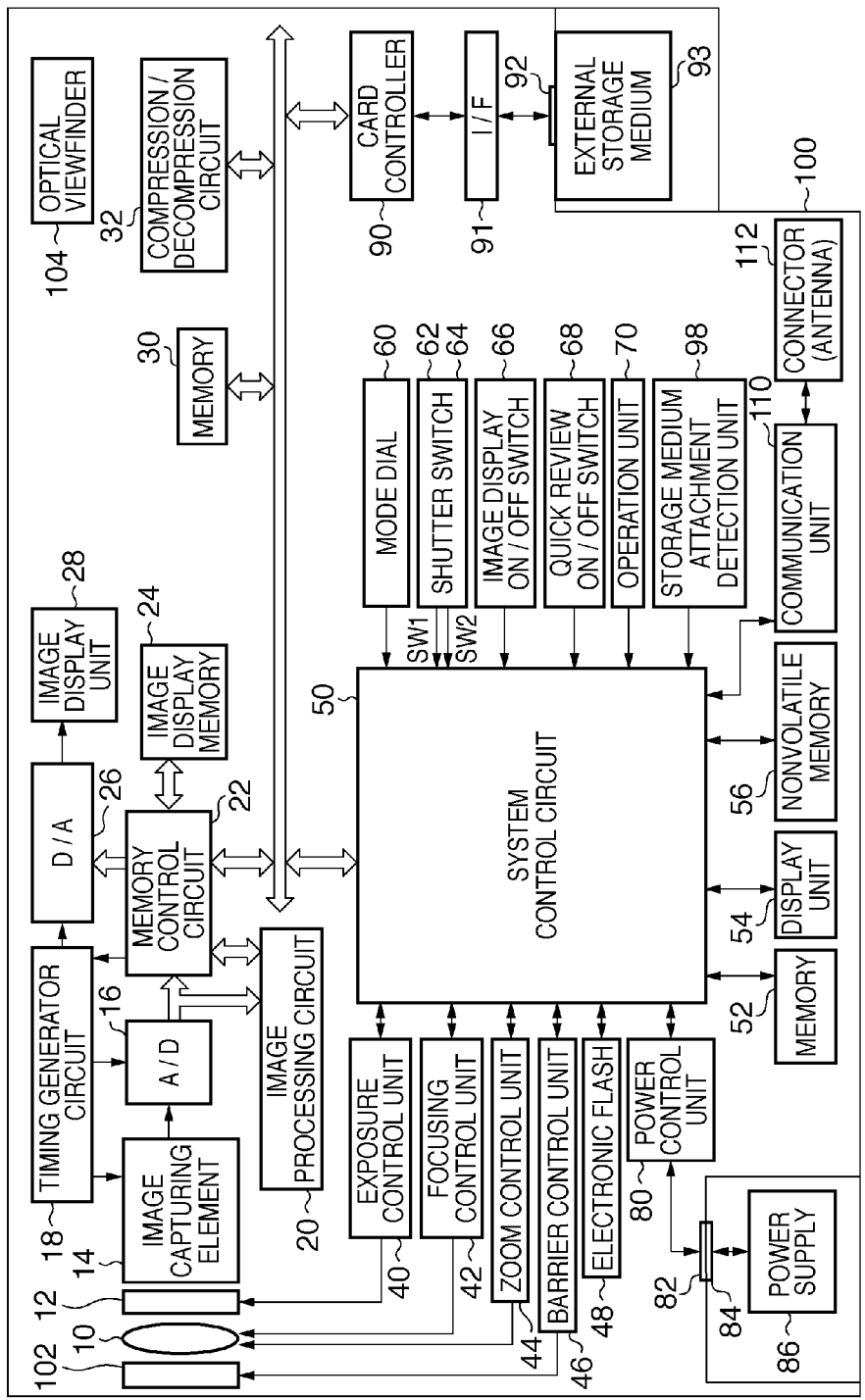
FIG. 1 is a block diagram showing the arrangement of a digital camera according to an embodiment of the present invention.

FIG. 1 is a block diagram showing the arrangement of a digital camera 100 which is an example of an image processing apparatus to which an embodiment of the present invention can be applied.

Reference numeral 10 denotes a photographing lens; 12, a shutter having a stop function; 14, an image capturing element to convert an optical image into an electrical signal; and 16, an A/D converter 16 to convert the analog signal output from the image capturing element 14 into a digital signal. The digital camera 100 is an arrangement example of an image transmission managing apparatus according to the present invention.

A timing generation circuit 18 supplies clock signals and control signals to the image capturing element 14, A/D converter 16, and a D/A converter 26. A memory control circuit 22 and a system control circuit 50 control the timing generation circuit 18.

An image processing circuit 20 executes predetermined pixel interpolation processing and color conversion processing for data from the A/D converter 16 or the memory control circuit 22.

The image processing circuit 20 also executes predetermined arithmetic processing using captured image data. The system control circuit 50 controls an exposure control unit 40 and a focusing control unit 42 based on the arithmetic result obtained by the image processing circuit 20. More specifically, the system control circuit 50 performs AF (Automatic Focus) processing, AE (Automatic Exposure) processing, and EF (Electronic Flash) processing of TTL (Through The Lens) scheme.

The image processing circuit 20 also executes predetermined arithmetic processing using captured image data and performs AWB (Automatic White Balance) processing of TTL based on the obtained arithmetic result.

The memory control circuit 22 controls the A/D converter 16, the timing generation circuit 18, the image processing circuit 20, an image display memory 24, the D/A converter 26, a memory 30, and a compression/decompression circuit 32.

Data from the A/D converter 16 is written in the image display memory 24 or the memory 30 via the image processing circuit 20 and the memory control circuit 22 or written via the memory control circuit 22 without intervening the image processing circuit 20.

Reference numeral 24 denotes the image display memory; 26, the D/A converter, and 28, an image display unit formed from a TFT LCD. Display image data written in the image display memory 24 is displayed on the image display unit 28 via the D/A converter 26.

An electronic viewfinder function can be implemented by sequentially displaying captured image data on the image display unit 28.

The image display unit 28 can arbitrarily turn on/off its display in accordance with an instruction from the system control circuit 50. In a display OFF state, power consumption of the digital camera 100 can greatly be reduced.

The memory 30 stores captured still images and moving images and has a sufficient memory capacity to store a predetermined number of still images or moving images in a predetermined time.

This makes it possible to write an enormous amount of image data in the memory 30 at a high speed even in a sequential shooting or panoramic shooting mode to continuously take a plurality of still images.

The memory 30 can also serve as the work area of the system control circuit 50.

The compression/decompression circuit 32 compresses or decompresses image data using, for example, adaptive discrete cosine transform (ADCT). The compression/decompression circuit 32 reads out an image from the memory 30, compresses or decompresses it, and writes the processed data in the memory 30.

The exposure control unit 40 controls the shutter 12 having a stop function. The exposure control unit 40 also has an electronic flash brightness control function in cooperation with an electronic flash 48.

The focusing control unit 42 controls focusing of the photographing lens 10. A zoom control unit 44 controls zooming of the photographing lens 10. A barrier control unit 46 controls the operation of a protection unit 102 serving as a barrier.

The electronic flash 48 has an AF auxiliary light projecting function and an electronic flash brightness control function. The exposure control unit 40 and the focusing control unit 42 are controlled by TTL. The system control unit 50 controls the exposure control unit 40 and the focusing control unit 42 based on an arithmetic result obtained by the image processing circuit 20.

The system control circuit 50 controls the entire digital camera 100 in accordance with programs and input signals from the units. More specifically, the system control circuit 50 executes control processing such as display control processing and communication control processing. The system control circuit 50 also executes various kinds of processing necessary in this embodiment, including object recognition processing for a captured image, processing of checking an object recognition result and management data, and status data generation processing. In the object recognition processing, a region where an object is captured is specified from the region of captured image data. An object region is, for example, the face region of an object. Note that the system control circuit 50 need not always be formed from a piece of hardware. A plurality of pieces of hardware serving as control units may divide the functions to implement the function of the digital camera 100. A memory 52 stores constants, variables, and programs for the operation of the system control circuit 50.

A display unit 54 includes, for example, a liquid crystal display device and a speaker to display an operation state or a message using a text, an image, or a voice in accordance with program execution by the system control circuit 50. The display unit 54 includes a single or a plurality of units arranged visible positions near the operation unit of the digital camera 100 and is formed by combining, for example, LCDs, LEDs, and sound generation elements.

Some functions of the display unit 54 are arranged in an optical viewfinder 104. Of the display contents of the display unit 54, pieces of information associated with settings of shooting are displayed on the LCD, such as single/sequential shooting, self timer, compression ratio, number of recording pixels, number of recorded images, number of recordable images, shutter speed, F-number, exposure compensation, electronic flash, red eye mitigation, and macro shooting. Other examples are buzzer setting, clock battery level, battery level, error, information represented by a number of a plurality of digits, the attached state of an external storage medium 93, communication I/F operation, and date/time.

Of the display contents of the display unit 54, those displayed in the optical viewfinder 104 are in-focus, camera shake warning, electronic flash charge, shutter speed, F-number, and exposure compensation.

A nonvolatile memory 56 is an electrically erasable/recordable memory such as an EEPROM. In this embodiment, management data that manages object information and information on an image destination in association with each other is stored in the nonvolatile memory.

Reference numerals 60, 62, 64, 66, 68, and 70 denote operation means for inputting various kinds of operation instructions of the system control circuit 50. They are formed from one or a plurality of combinations of switches, dials, touch panel, pointing by line-of-sight detection, and voice recognition device.

The operation means will be described here in detail.

The mode dial switch 60 can selectively set functional modes such as power off, automatic shooting mode, shooting mode, panoramic shooting mode, playback mode, multiwindow playback/erase mode, and PC connection mode.

The switch 62 is a shutter switch SW1. The shutter switch SW1 is turned on halfway through the operation of a shutter button (not shown) to instruct the start of an operation such as AF (Automatic Focus) processing, AE (Automatic Exposure) processing, AWB (Automatic White Balance) processing, or EF (Electronic Flash) processing.

The switch 64 is a shutter switch SW2. The shutter switch SW2 is turned on at the end of the operation of the shutter button (not shown) to give the instruction for a series of processes including exposure processing, development processing, and recording processing. In the exposure processing, image data corresponding to a signal read out from the image capturing element 14 is written in the memory 30 via the A/D converter 16 and the memory control circuit 22. The development processing is executed using arithmetic processing of the image processing circuit 20 or the memory control circuit 22. In the recording processing, image data is read out from the memory 30, compressed by the compression/decompression circuit 32, and written in the external storage medium 93.

The image display ON/OFF switch 66 can set ON/OFF of the image display unit 28 and also set ON/OFF of the display mode of the present invention.

With this function, the image display ON/OFF switch 66 stops power supply to the image display unit including, for example, a TFT LCD when performing shooting using the optical viewfinder 104, thereby saving power. It is also possible to switch use/non-use of the display mode in accordance with the user's intention.

The quick review ON/OFF switch 68 sets a quick review function of automatically playing back captured image data immediately after shooting.

The operation unit 70 includes various kinds of buttons and a touch panel. The operation unit 70 includes, for example, a menu button, set button, macro button, multiwindow playback page break button, flash setting button, and single shooting/sequential shooting/self timer switching button. The operation unit 70 also includes a menu move +(plus) button, menu move – (minus) button, playback image move + (plus) button, and playback image move – (minus) button. The operation unit 70 also includes a shooting image quality selection button, exposure compensation button, and date/time setting button. In this embodiment, specifying or selection of an icon is also done using the operation unit.

A power control unit 80 includes a battery detection circuit, DC/DC converter, and switch circuit to select a block to be energized. The power control unit 80 detects the presence/absence of a battery, battery type, and battery level, controls the DC/DC converter based on the detection result and an instruction from the system control circuit 50, and supplies a necessary voltage to the units including a storage medium for a necessary period.

Reference numeral 82 denotes a connector; 84, a connector; and 86, a power supply unit including a primary cell such as an alkaline cell or lithium cell, a secondary cell such as an NiCd cell, NiMH cell, or Li cell, or an AC adapter.

A card controller 90 transmits/receives data to/from an external storage medium such as a memory card. Reference numeral 91 denotes an interface to an external storage medium such as a memory card. A connector 92 connects an external storage medium such as a memory card. The external storage medium 93 is, for example, a memory card. A storage medium attachment detection unit 98 detects whether the external storage medium 93 is attached to the connector 92.

The protection unit 102 serving as a barrier covers the image capturing unit including the lens 10 of the digital camera 100, thereby preventing the image capturing unit from being soiled or damaged.

Shooting can be done using only the optical viewfinder 104 without using the electronic viewfinder function of the image display unit 28. The optical viewfinder 104 incorporates some functions of the display unit 54 to display, for example, in-focus, camera shake warning, electronic flash charge, shutter speed, F-number, and exposure compensation.

A communication unit 110 which wirelessly communicates with another device is connected to an antenna 112. The overall system arrangement of the digital camera 100 has been described above.

Figures 2, 3:
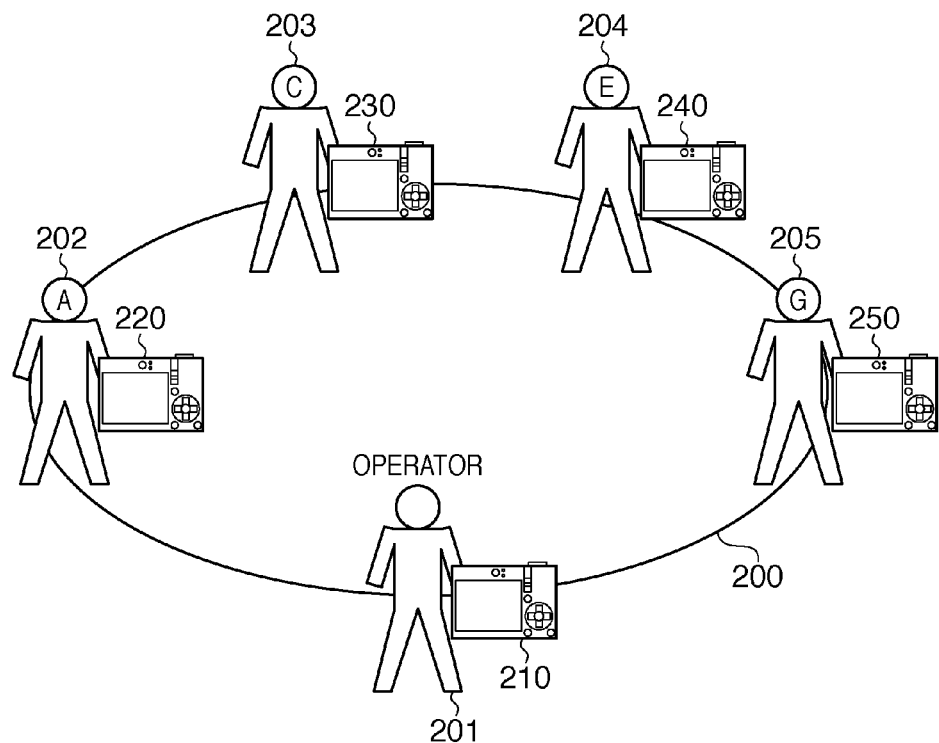
FIG. 2 is a view showing an example of the arrangement of a network according to the embodiment of the present invention.
FIG. 3 is a view showing management data according to the embodiment of the present invention.

FIG. 2 is a view showing an example of the arrangement of a system according to this embodiment. A digital camera 210 held by an operator 201 can wirelessly be connected via a wireless network 200 to digital cameras 220, 230, 240, and 250 held by other users 202, 203, 204, and 205. Each of the digital cameras 210, 220, 230, 240, and 250 has the same arrangement as the digital camera 100 shown in FIG. 1. In this embodiment, the wireless network will be explained as a wireless LAN such as IEEE802.11a/b/g. However, the type of the wireless network does not limit the present invention. UWB (Ultra Wide Band) used for Wireless USB or Bluetooth is also usable.

These devices store in advance, on a memory, information about an SSID that is network identification information used in a general wireless LAN, and wireless parameters such as a wireless communication channel and an encryption key. A wireless LAN network is built based on the parameters. "SSID" is a short for "Service Set IDentifier".

FIG. 3 is a view showing management data which manages object information and information on an image destination in association with each other.

As shown in FIG. 3, the management data includes a registered name to identify each of a plurality of registered management data, a wireless LAN parameter, and object information (registered face data) associated with the wireless LAN parameter.

When a registered object exists in a captured image, the management data is used to transmit the image to another target digital camera using a wireless LAN parameter corresponding to the object. Note that it is possible to register a plurality of face data in association with one wireless LAN parameter.

The management data can be registered by the following methods after face data to be registered is cut out by operating the operation unit of the digital camera. For example, a method of manually inputting a wireless LAN parameter, a method of connecting a PC to the digital camera and transmitting registration data created in the PC to the camera, and a method of transmitting registration data using wireless communication are usable. In this embodiment, however, the management data is registered in the digital camera by some method, and the registration method does not limit the present invention.

Figures 4, 5:
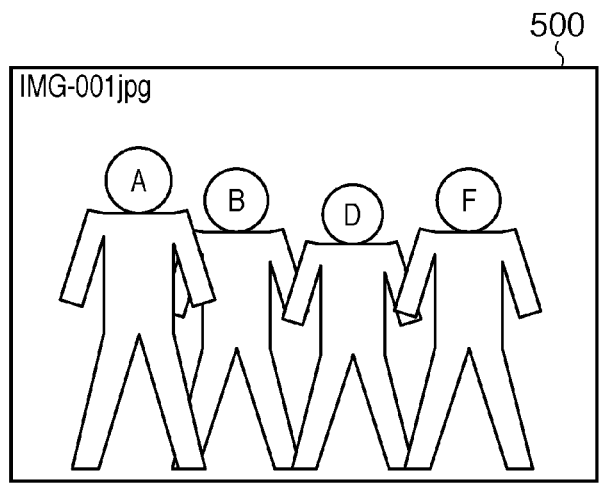
FIG. 4 is a view showing an image status table according to the embodiment of the present invention.
FIG. 5 is a view showing image data according to the embodiment of the present invention.

FIG. 4 is a view showing an image status table 400 which is obtained by checking a result of object recognition for image data and management data 300 shown in FIG. 3.

In this embodiment, object recognition is performed for image data 500 shown in FIG. 5. In this case, it is checked for each of recognized face data (faceA, faceB, faceD, and faceF) whether the data is registered in the management data 300 in FIG. 3. The number of wireless LAN parameters registered in association with each face data and the wireless LAN parameters are stored.

In this case, wireless LAN parameters WirelessParam1 and WirelessParam2 are associated with faceA. A wireless LAN parameter associated with face data will be referred to as the corresponding wireless LAN parameter of the face data hereinafter. The corresponding wireless LAN parameters of faceA are WirelessParam1 and WirelessParam2, and the number of registered parameters is 2. Check processing with the management data 300 is similarly done for faceB, faceD, and faceF included in the image data 500, thereby calculating the number of registered parameters, and corresponding wireless LAN parameters. Additionally, the current image transmission condition for the corresponding wireless LAN parameters calculated by the above-described processing is stored as a transmission status.

Figure 6:
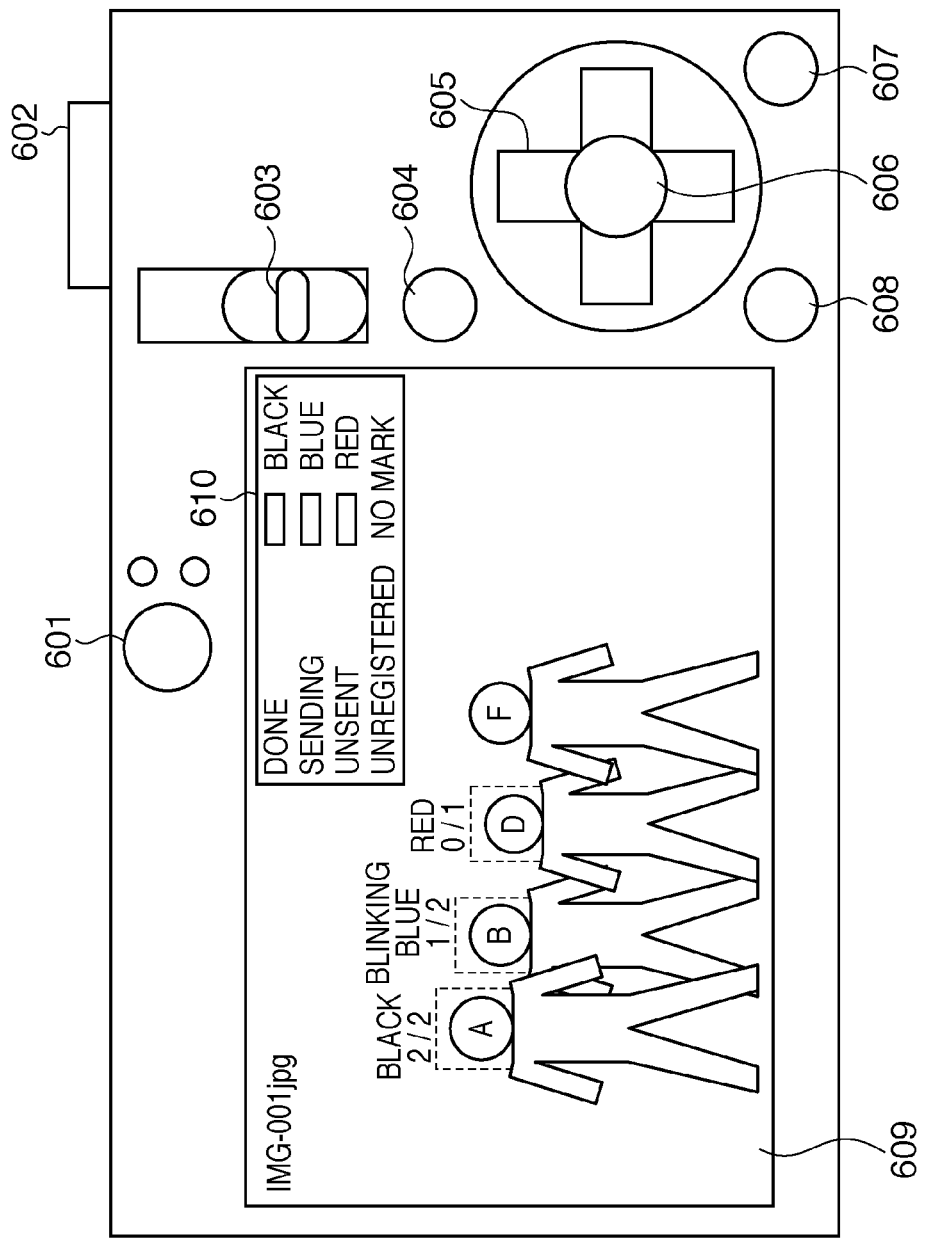
FIG. 6 is a view showing the outer appearance of a digital camera and a display example of an LCD according to the first embodiment of the present invention.

FIG. 6 is a view showing the outer appearance of the digital camera 100 and a display example of the LCD according to this embodiment. FIG. 6 shows image transmission conditions associated with the respective objects in the captured image.

Reference numeral 601 denotes an optical viewfinder; 602, a shutter button; and 603, a mode dial switch. Behavior in a playback mode set by the mode dial switch will be described. A function button 604 is assigned execution of various kinds of processing such as printing and image transmission. An operation unit 605 can select a menu or move a cursor using a 4-way selector. An enter button 606 is pressed to execute processing selected in a menu. A menu button 607 is pressed to invoke a menu for various settings. A display button 608 is pressed to turn on/off image display on an LCD 609 or the display mode. Reference numeral 609 denotes an LCD; and 610, a list of transmission statuses of an image displayed on the LCD. The transmission status list is a list of the meanings of the contents of transmission statuses.

Figure 7:
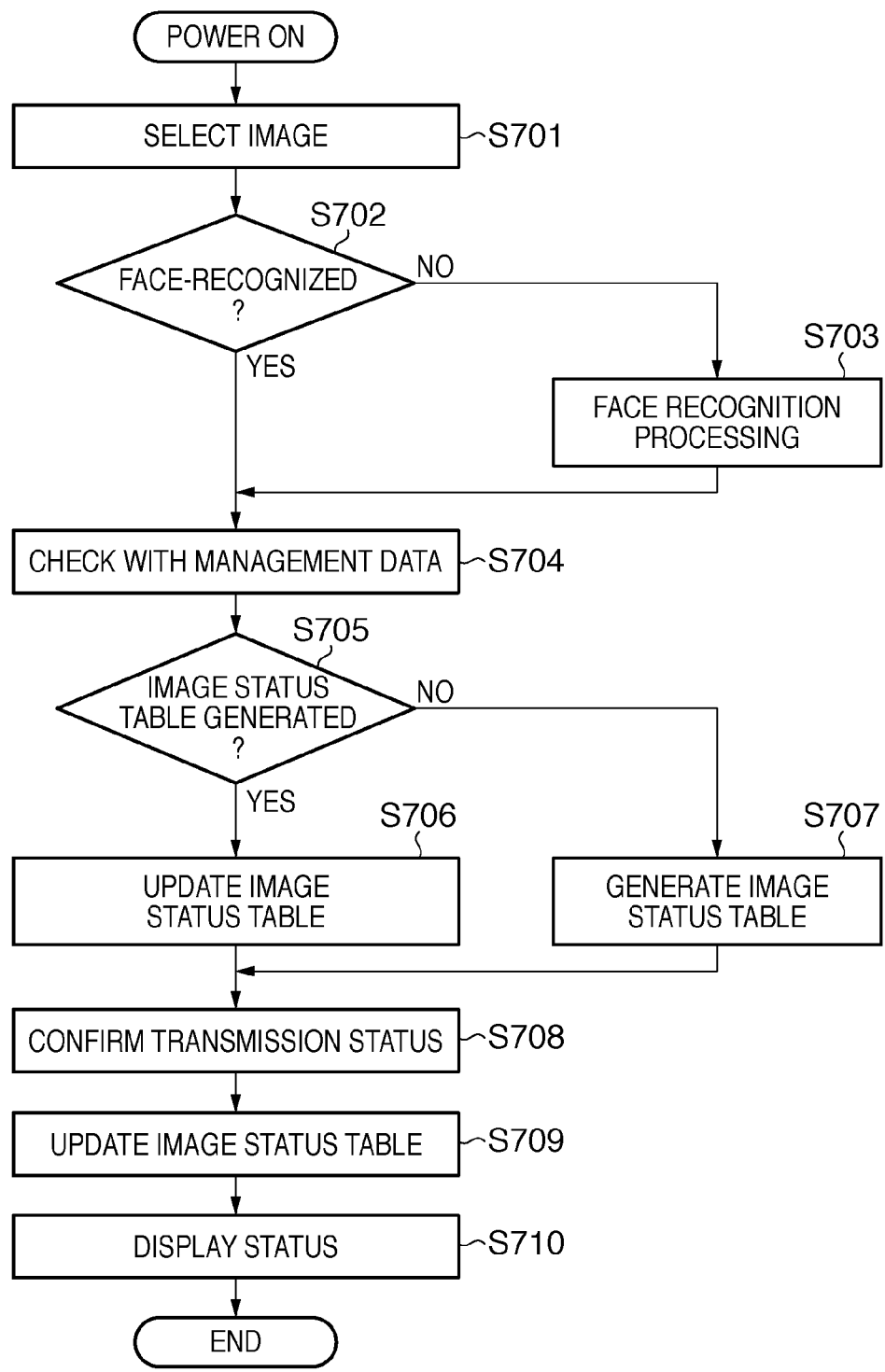
FIG. 7 is a flowchart illustrating a processing sequence according to the first embodiment of the present invention.

FIG. 7 is a flowchart illustrating a processing sequence of the digital camera 210 according to this embodiment. The process procedure will be described below in detail with reference to FIG. 7. Assume that the display mode is enabled by default.

First, the operator 201 sets the mode dial switch 603 of the digital camera 210 of his/her own to the playback mode, and powers on the camera. In step S701, the operator 201 selects an image to be displayed using the operation unit 605.

In step S702, the digital camera 210 determines whether the selected image has already undergone face recognition processing. Whether face recognition processing has already been done can be determined depending on whether the image status table 400 (to be described later) corresponding to the selected image exists because the image status table 400 is stored in association with the image after face recognition processing.

If it is determined step S702 that face recognition processing has not been performed yet, the digital camera 210 executes face recognition processing to identify face data in step S703. In the image data 500, faceA, faceB, faceD, and faceF are derived as a face recognition result.

In step S704, the digital camera 210 performs check processing between the face recognition result and the management data 300 shown in FIG. 3. In this case, faceA is registered for Mr./Ms. A 301 and Mr./Ms. C 302, faceB is registered for Mr./Ms. C 302 and Mr./Ms. E 303, faceD is registered for Mr./Ms. G 304, and faceF is not registered.

Even image data for which an image status table is already generated because it has already undergone face recognition processing and check processing with the management data is subjected again to the check processing with the management data 300. This is because if new object information and information on an image destination are registered after generation of the image status table, the management data 300 may have been updated.

In step S705, the digital camera 210 determines whether the image status table 400 is already generated. If it is determined that the image status table 400 is already generated, the digital camera 210 updates the image status table in step S706. On the other hand, if it is determined that the image status table 400 is not generated yet, the digital camera 210 generates a new image status table and stores it in association with the image data 500 in step S707.

In step S708, the digital camera 210 confirms the transmission status of the image data 500. The transmission status is managed in the image status table 400 in association with the face data (faceA, faceB, faceD, and faceF) identified by face recognition and wireless LAN parameters (the number of registered parameters) corresponding to the face data. As the transmission status of each face data, the number of transmitted data/the total number of transmission data (detailed transmission information: the transmission condition for each wireless LAN parameter associated with face data) is managed.

Immediately after generation of the image status table, the total numbers of transmission data are faceA=2, faceB=2, faceD=1, and faceF=0 based on the check result in step S704. Every time an image is transmitted, the number of transmitted data is incremented. The detailed transmission information represents transmitted=done, transmitting=sending, untransmitted=unsent, and unregistered="unregistered" for each wireless LAN parameter.

Transmitted=done represents that an image is already transmitted. Transmitting=sending represents that an image is being transmitted. Untransmitted=unsent represents that an image is not transmitted yet. Unregistered=unregistered represents that information on a destination corresponding to an object is not registered yet.

In step S709, the digital camera 210 updates the image status table based on the transmission statuses confirmed in step S708. In step S710, the digital camera 210 displays the transmission statuses on the screen of the LCD 609 based on the updated image status table.

Each transmission status is displayed near a corresponding face recognized by face recognition. This enables to visually recognize the transmission status for each object.

Additionally, the transmission statuses can be classified by colors. For example, "done" is displayed in black, "sending" in blinking blue, "unsent" in red, and "unregistered" without any mark. This makes it possible to more easily visually recognize the transmission statuses. The contents to be displayed as the transmission statuses are "the number of already transmitted data/the total number of transmission data" stored in the image status table. This allows the user to know transmission for which face data is ended, and transmission for which face data is not ended.

Figure 8:
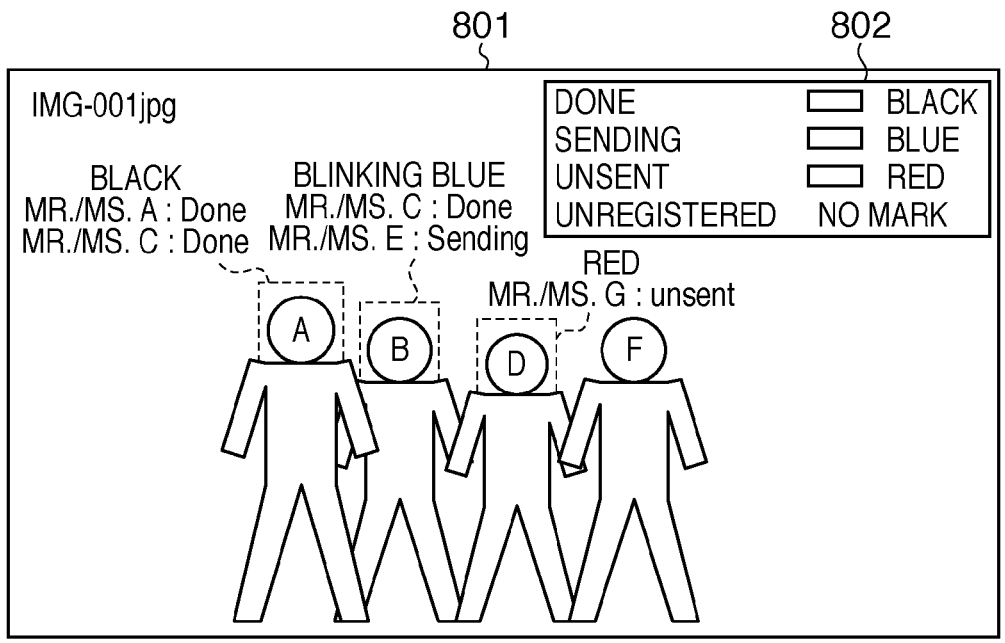
FIG. 8 is a view showing a display example of the LCD according to the first embodiment of the present invention.

When the user presses the display button 608 in this state, the transmission status display mode can be changed to that shown in FIG. 8. In this mode, the detailed transmission information (unsent, sending, and done) is displayed so that the user can know the transmission status for each wireless parameter associated with each face data.

Figure 9:
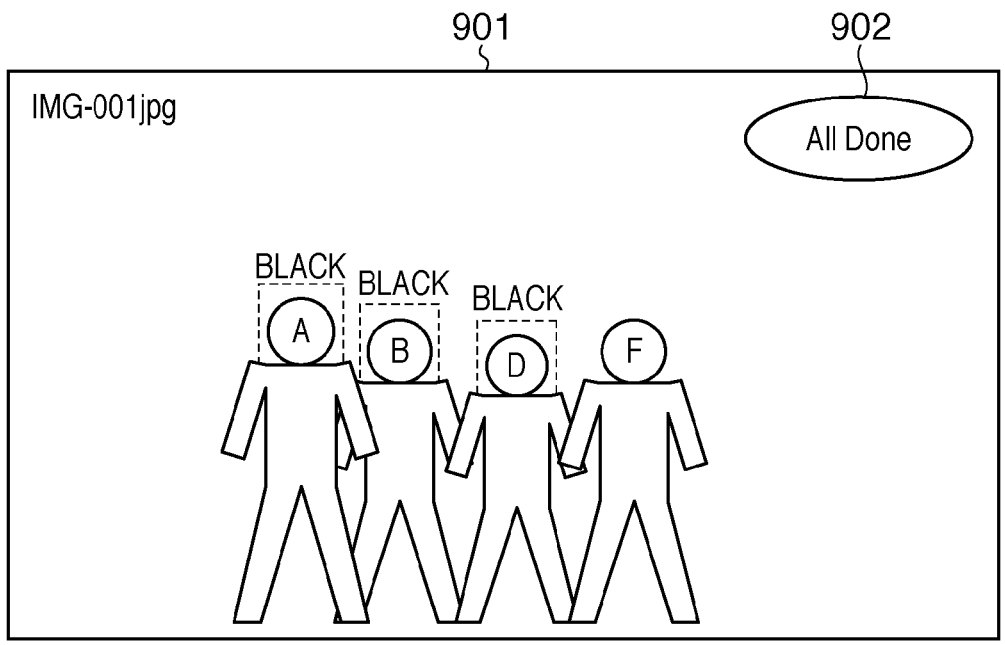
FIG. 9 is a view showing another display example of the LCD according to the first embodiment of the present invention.

FIG. 9 is a view showing a display example when image transmission is ended for all wireless parameters associated with each face data. When transmission to all image transmission destinations registered for the displayed image is ended, information representing it is indicated by an icon 902. That is, in this embodiment, the contents of the transmission statuses are discriminably displayed by icons or colors.

Figure 10:
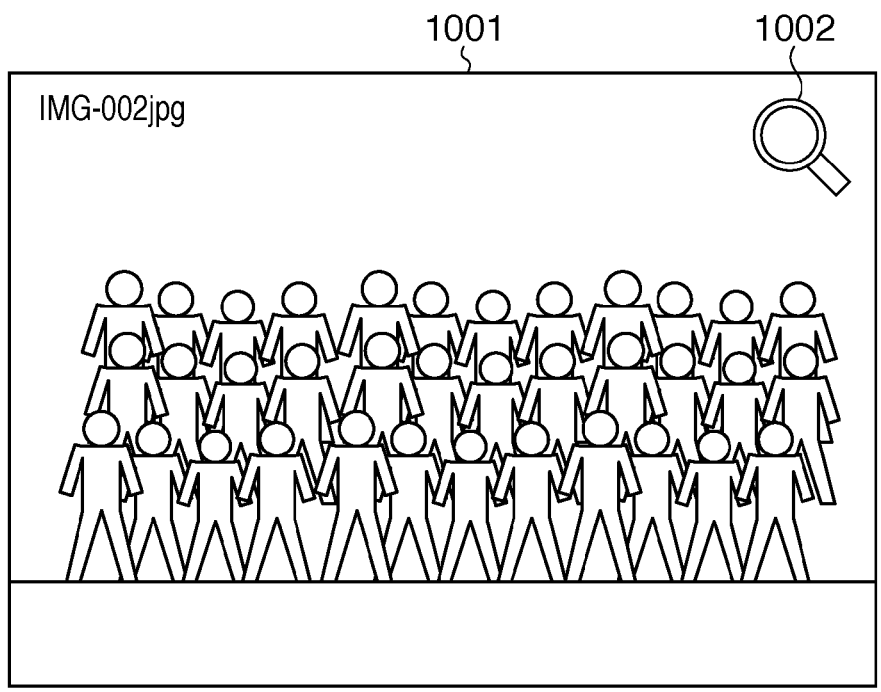
FIG. 10 is a view showing still another display example of the LCD according to the first embodiment of the present invention.
Figure 11:
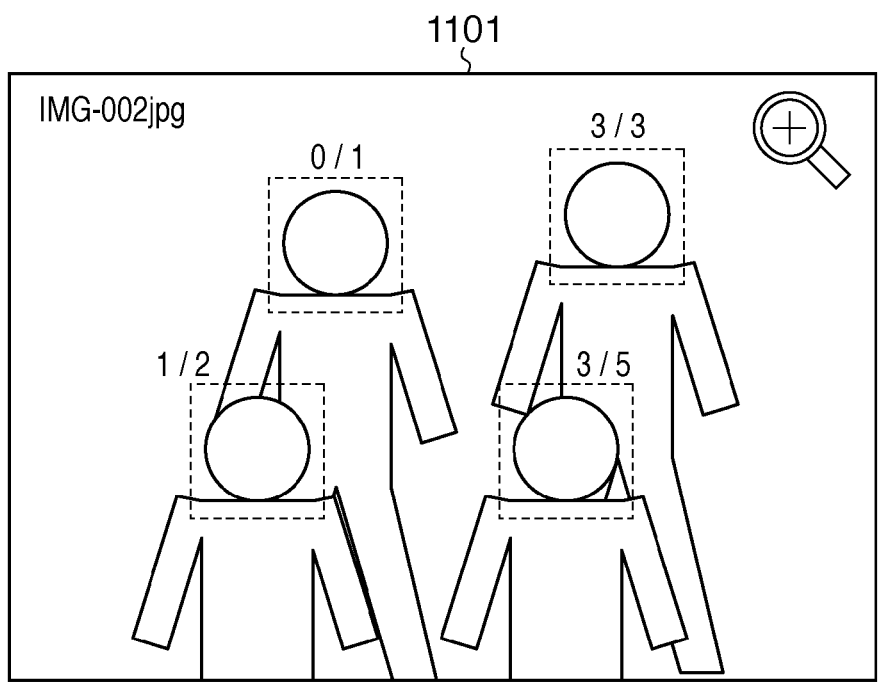
FIG. 11 is a view showing still another display example of the LCD according to the first embodiment of the present invention.

Assume that the image selected in step S701 for display is a group photo as shown in FIG. 10. If all transmission statuses are displayed in this state, they cannot be identified on the small LCD. In this case, the transmission statuses are displayed when the image is enlarged to such a level that the user can identify each transmission status, as shown in FIG. 11. An icon 1002 displayed on the image before enlargement makes it possible to notify the user that the transmission statuses are displayed by enlargement. Several methods are usable to determine whether to inhibit display of the transmission statuses as shown in FIG. 10 or to display the transmission statuses as shown in FIG. 11. For example, when faces in a number larger than a threshold value are detected in the displayed image, the digital camera 100 does not display the transmission statuses. When faces in a number smaller than the threshold value are detected in the displayed image, the digital camera displays the transmission statuses.

Alternatively, when faces in a number larger than a threshold value are detected in the displayed image, the digital camera causes the user to select objects for which the transmission statuses are to be displayed. When faces in a number smaller than the threshold value are detected in the displayed image, the digital camera displays the transmission statuses of all objects. To make the user select an object for which the transmission status should be displayed, the digital camera 100 displays a cursor or the like in the window shown in FIG. 10. When the user selects a desired object using the operation unit 605, the digital camera 100 displays the transmission status of the selected object.

As described above, according to this embodiment, face data that is object information and a wireless LAN parameter that is information on an image destination are managed in association with each other. When a registered object is included in image data, and the image data is to be transmitted to a corresponding transmission destination, a status concerning image transmission can be displayed on the image data in association with the object. This makes it possible to display various statuses concerning image transmission in association with the objects included in image data so that the user can easily recognize them.

In this embodiment, the digital camera is activated in the playback mode, and an already captured image is selected. However, the digital camera may be activated in a shooting mode. After shooting, the above-described display mode may be applied in a captured image confirmation window.

<Second Embodiment>

The second embodiment of the present invention will be described next. In the first embodiment, a method has been described, in which face recognition processing of an image is performed, and transmission statuses are displayed in association with face data. In the second embodiment, a method will be described, in which the icon of a displayed transmission status is selected by operating an operation unit, and processes such as image transmission, reservation image transmission, and management data registration to be executed later are performed.

A digital camera according to the second embodiment is the same as in the first embodiment and has the arrangement shown in FIG. 1. The network configuration of the digital camera according to the second embodiment is also the same as in the first embodiment shown in FIG. 2.

As in the first embodiment, the digital cameras store in advance, on a memory, information about an SSID that is network identification information used in a general wireless LAN, and wireless parameters such as a wireless communication channel and an encryption key. The digital camera builds a wireless LAN network based on the parameters.

The wireless network built in this embodiment will be explained as a wireless LAN such as IEEE802.11a/b/g. However, the type of the wireless network does not limit the present invention. For example, UWB (Ultra Wide Band) used for Wireless USB or Bluetooth is also usable.

Management data which stores object information and information on an image destination in association with each other is also the same as in the first embodiment and has the structure shown in FIG. 3. An image status table which is obtained by checking a result of object recognition for image data shown in FIG. 5 and management data is also the same as in the first embodiment and has the arrangement shown in FIG. 4.

Figure 12:
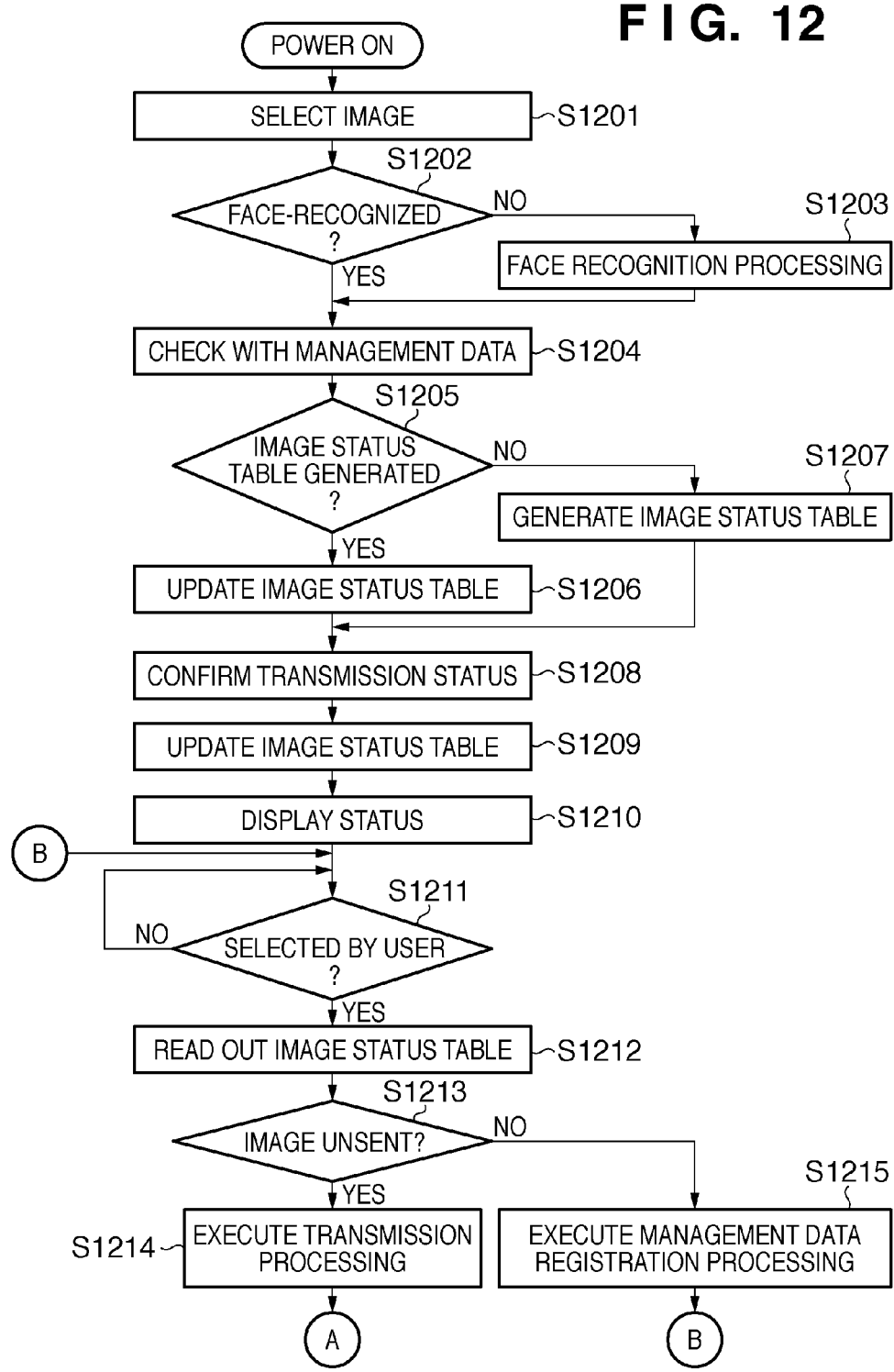
FIG. 12 is a flowchart illustrating a processing sequence according to the second embodiment of the present invention.
Figure 13:
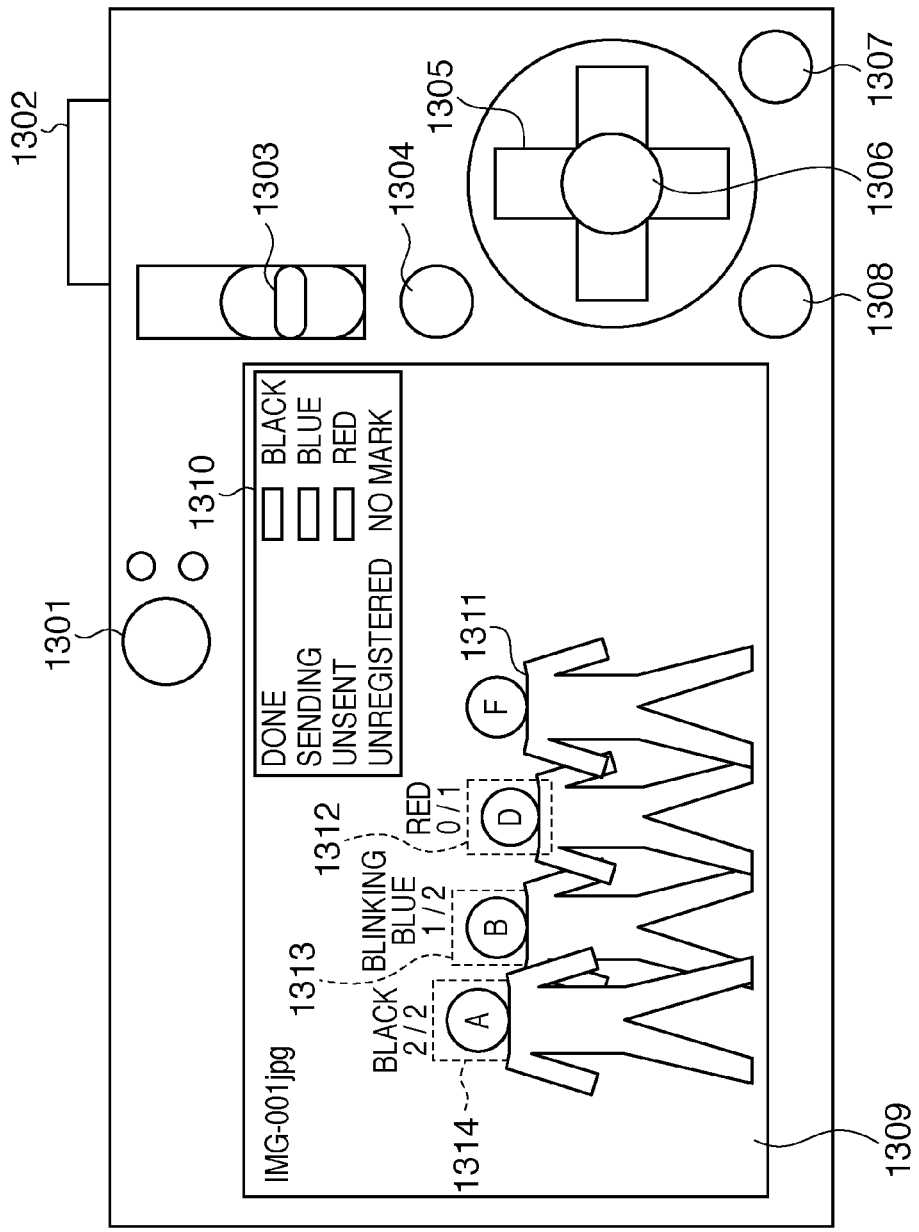
FIG. 13 is a view showing a display example of the LCD according to the second embodiment of the present invention.
Figure 14:
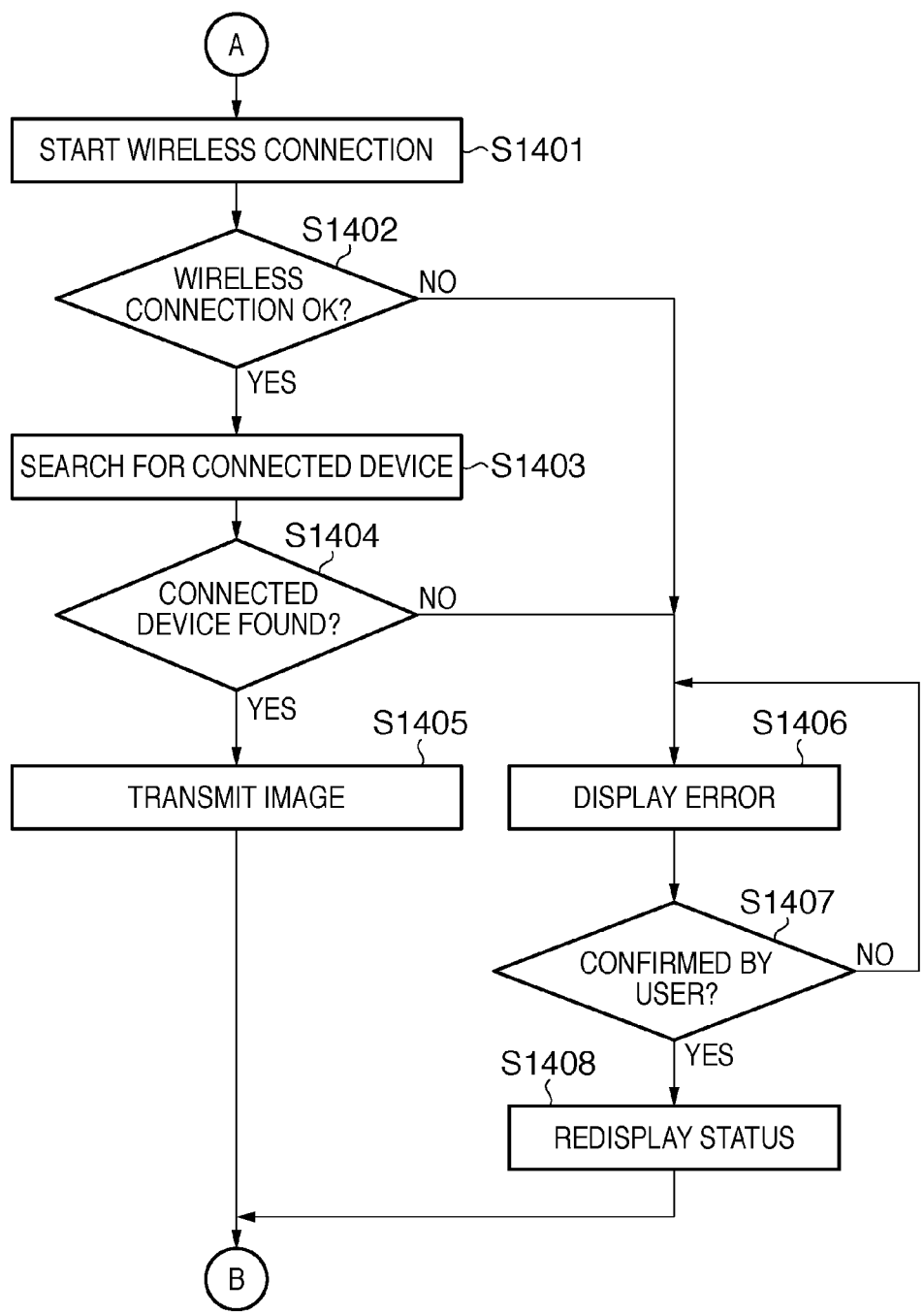
FIG. 14 is a flowchart illustrating another processing sequence according to the second embodiment of the present invention.

FIGS. 12 and 14 are flowcharts illustrating the processing sequence of the digital camera according to this embodiment. FIGS. 13, 15, 16, and 17 are views showing the outer appearance of a digital camera 100 and display examples of an LCD according to this embodiment. The process procedure will be described below in detail with reference to these drawings.

A series of processes in steps S1201 to S1210 are the same as in the first embodiment, and a description thereof will not be repeated.

After transmission statuses are displayed in step S1210, the digital camera determines in step S1211 whether the user has input an instruction using an operation unit 1305. At this time, the user can select the icon cursor of a displayed transmission status using the operation unit 1305. A currently selected icon cursor is displayed larger than the remaining icon cursors, as indicated by 1312, to notify the user the currently selected icon.

In this embodiment, movement of an icon cursor may be allowed only for a transmission status capable of expecting subsequent processing. That is, the icon cursor of a transmission status representing "done" cannot be moved. For a transmission status representing a transmission condition that disables execution of subsequent processing, the icon cursor is inhibited from moving not to receive an instruction of processing after the transmission condition. In addition, the device as the transmission destination corresponding to the transmission status may be inquired about the power supply state. If the power of the device is off, movement of the icon cursor of the transmission status may be inhibited.

For example, when the user selects and specifies an object 1311 having transmission status "unregistered", management data registration processing is executable as subsequent processing. When the user selects and specifies the object 1312 having transmission status "unsent", transmission processing is executable as subsequent processing. When the user specifies an object 1313 having transmission status "sending", transmission stop is executable as subsequent processing. The user cannot select and specify an object 1314 having transmission status "done".

In this embodiment, the currently specified icon cursor is enlarged so as to be discriminable. Instead, only the currently specified icon cursor may be changed to an icon having another shape. Alternatively, the color of only the specified icon cursor may be changed to make the icon discriminable.

It is also possible to set a plurality of processes in correspondence with each transmission status as the processing after the transmission condition represented by the transmission status. For example, when the user selects an icon cursor representing transmission status "unsent", reservation transmission processing can be set as well as transmission processing. That is, in this embodiment, a transmission status is set to give the instruction for processing after the transmission condition represented by the transmission status.

In this embodiment, processing executed when the object D 1312 is selected, as shown in FIG. 13, by a user operation in step S1211 will be described.

Upon determining in step S1211 that the user has input a selection instruction, the digital camera reads out, from a memory, an image status table corresponding to the selected and specified face data in step S1212. In this embodiment, since the object D is selected, a transmission status 403 is read out.

In step S1213, the digital camera determines whether the readout transmission status represents an image unsent state. If it is determined in step S1213 that the readout transmission status does not represent an image unsent state, the digital camera performs management data registration processing in step S1215 and then returns to state B.

The management data can be registered by the following methods after face data to be registered is cut out by operating the operation unit 1305 of the digital camera. For example, a method of manually inputting a wireless LAN parameter, a method of connecting a PC to the digital camera and transmitting registration data created in the PC to the camera, and a method of transmitting registration data using wireless communication are usable. In this embodiment, however, the management data is registered in the digital camera by some method, and the registration method does not limit the present invention.

If it is determined in step S1213 that the readout transmission status represents an image unsent state, the digital camera advances to state A to execute image transmission processing in step S1214. The image transmission processing from state A will be described in detail with reference to FIG. 14.

As is apparent from the readout transmission status 403, the wireless LAN parameter to execute the selected and specified image transmission is WirelessParam4. Hence, in step S1401, the digital camera starts wireless LAN connection using the wireless LAN parameter "WirelessParam4". In step S1402, it is determined whether the wireless connection using WirelessParam4 has succeeded.

If it is determined that the wireless connection has succeeded, the digital camera searches for a connected device in step S1403. The connected device search method can be implemented using UPnP (Universal Plug and Play) or Bonjour widely used in the network world. The type of the search method does not limit the present invention.

If it is determined in step S1404 that a connected device is found, the digital camera transmits the image to the connected device in step S1405 and then returns to state B.

If it is determined in step S1402 that the wireless connection has failed, or if it is determined in step S1404 that no connected device is found, the digital camera displays an error on the LCD in step S1406. In step S1407, the user confirms the error display. In step S1408, the digital camera displays the status data again and then returns to state B.

As described above, it is possible to register a plurality of subsequent processes for one transmission status. For, for example, transmission status "unsent", reservation transmission can be set in addition to the image transmission processing described with reference to FIG. 14. Display related to the reservation transmission processing will be described with reference to FIGS. 15, 16, and 17.

Figure 15:
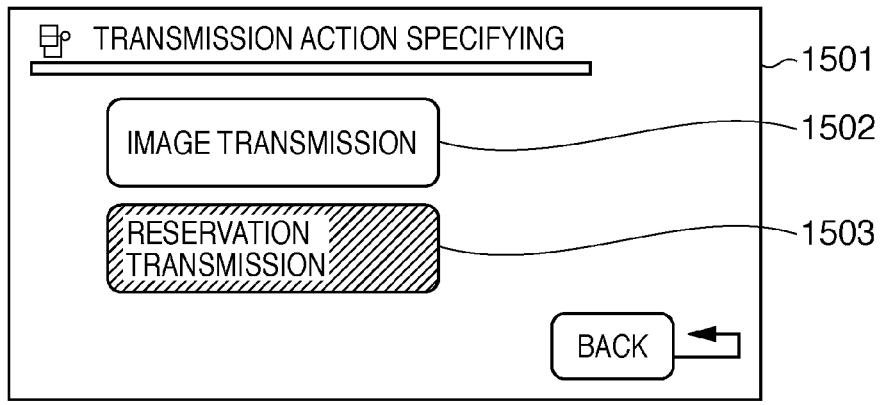
FIG. 15 is a view showing another display example of the LCD according to the second embodiment of the present invention.
Figure 16:
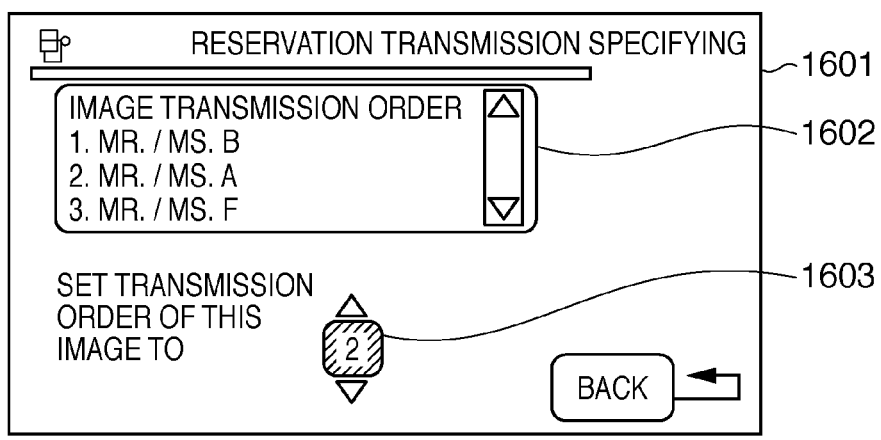
FIG. 16 is a view showing still another display example of the LCD according to the second embodiment of the present invention.

When the user selects the object 1312 using the icon cursor in FIG. 13, the window changes to a window 1501 shown in FIG. 15 to allow the user to select image transmission or reservation transmission. When the user selects reservation transmission 1503, the window changes to a window 1601 shown in FIG. 16 to display a current transmission order 1602 and also to allow the user to specify the order of transmission to the transmission destination associated with the specified face image using a box 1603.

Figure 17:
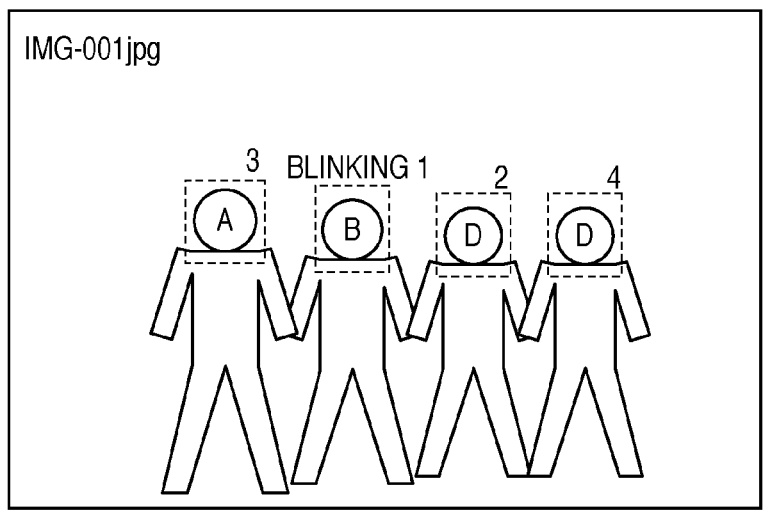
FIG. 17 is a view showing still another display example of the LCD according to the second embodiment of the present invention.

Assume that the user has set the transmission order of the image to the transmission destination associated with faceD of the selected object 1312 to "2". In this case, the transmission order is displayed in the transmission status near the icon cursor, as shown in FIG. 17.

When the reservation transmission is set, the digital camera temporarily disconnects wireless communication at the end of image transmission to the one transmission destination. The digital camera then reads out the transmission status of the next transmission order. The digital camera repeatedly execute wireless parameter setting, wireless connection, connected device search, and image transmission up to the end of the transmission order in accordance with the procedure shown in FIG. 14. The date/time of image transmission may be specified in the window shown in FIG. 16. In this case, the digital camera 100 executes image transmission when the value of an internal timer (not shown) has reached the specified date/time.

As described above, according to this embodiment, face data that is object information and a wireless LAN parameter that is information on an image destination are managed in association with each other. When a registered object is included in image data, and the image data is to be transmitted to a corresponding transmission destination, a status concerning image transmission can be displayed on the image data in association with the object. This makes it possible to display various statuses concerning image transmission in association with the objects included in image data so that the user can easily recognize them.

The user can select a transmission status displayed in association with an object by operating the operation unit. Processing corresponding to the selected transmission status is executed. This enables explicitly specifying the next processing desired by the user. It is therefore possible to easily reflect the user's intention.

In this embodiment, the digital camera is activated in the playback mode, and an already captured image is selected. However, the digital camera may be activated in a shooting mode. After shooting, the above-described display mode may be applied in a captured image confirmation window.

In the above-described embodiment, an object is identified by recognizing a face. Instead, an object corresponding to a voice may be identified by recognizing the voice in the playback mode.

The means and steps constituting the above-described embodiments of the present invention can be implemented by causing programs stored in the RAM or ROM of a computer to run. The programs and a computer-readable recording medium which records the programs are incorporated in the present invention.

The present invention can be embodied as, for example, a system, apparatus, method, program, or recording medium. More specifically, the present invention may be applied to an apparatus including one device.

The present invention is also achieved by supplying a software program which implements the functions of the above-described embodiments to a system or apparatus directly or from a remote site and causing the computer of the system or apparatus to read out and execute the supplied program code.

Hence, the program code itself, which is installed in the computer to implement the functional processing of the present invention by the computer, also implements the present invention. That is, the present invention incorporates the computer program itself for implementing the functional processing of the present invention. In this case, the program can take any form such as an object code, a program to be executed by an interpreter, or script data to be supplied to the OS as long as the functions of the program can be obtained.

The functions of the above-described embodiments are implemented when the computer executes the readout program. The functions of the above-described embodiments are also implemented when, for example, the OS running on the computer partially or wholly executes actual processing based on the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit partially or wholly executes actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-326407, filed Dec. 18, 2007, which is hereby incorporated by reference herein in its entirety.

The invention claimed is:

1. An image processing apparatus comprising:
a registration unit configured to register object information and information on a transmission destination representing a transmission destination of image data in correspondence with each other;
an identification unit configured to identify an object based on a feature amount in a region representing the object in the image data;
a transmission unit configured to transmit the image data to a transmission destination represented by information on a transmission destination corresponding to object information of the object identified by said identification unit; and
a display control unit configured to display, on a display unit, a transmission status of the image data by said transmission unit together with the image data,
wherein when the identification unit identifies a plurality of objects in the image data, said display control unit displays the transmission status for each of the plurality of objects identified by said identification unit.

2. The apparatus according to claim 1, wherein the transmission status includes at least one of information representing that the image data is transmitted, information representing that the image data is being transmitted, information representing that the image data is not yet transmitted, information representing that the information on a transmission destination corresponding to the identified object information is not yet registered, the number of information on transmission destinations corresponding to the identified object information, and a transmission order of the image data to the transmission destination of the information on a transmission destination corresponding to the object information.

3. The apparatus according to claim 1, wherein said display control unit discriminably displays contents of the transmission status on the display unit.

4. The apparatus according to claim 1, wherein said display control unit discriminably displays contents of the transmission status on the display unit when the image data displayed on the display unit is enlarged to a size larger than a predetermined size.

5. The apparatus according to claim 4, further comprising a notification unit configured to notify that the discriminable information is displayed by enlarging the image data.

6. The apparatus according to claim 3, wherein the transmission status is discriminably displayed by at least one of an icon and color display.

7. The apparatus according to claim 6, wherein said display control unit displays the contents of the transmission status represented by the icon and color display as a list on the display unit together with the icon and color display.

8. The apparatus according to claim 1, wherein when transmission of the image data to the transmission destination represented by the information on a transmission destination corresponding to the object identified by said identification unit is completed, said display control unit displays information representing the completion on the display unit.

9. The apparatus according to claim 3, further comprising:
an operation unit configured to specify the discriminable information; and
an instruction unit configured to instruct processing after a transmission condition of the image data represented by the transmission status that is the discriminable information specified by operating said operation unit.

10. The apparatus according to claim 1, wherein said identification unit identifies the object by recognizing at least one of a face of the object and a voice corresponding to the object.

11. The apparatus according to claim 1, wherein said registration unit is configured to manage a plurality of pieces of object information in correspondence with the information on a transmission destination of one image data.

12. A method of controlling an image processing apparatus, comprising the steps of:
registering object information and information on a transmission destination representing a transmission destination of image data in correspondence with each other;
identifying an object based on a feature amount in a region representing the object in the image data;

transmitting the image data to a transmission destination represented by information on a transmission destination corresponding to object information of the identified object; and displaying, on a display unit, a transmission status of the image data together with the image data, wherein when a plurality of objects are identified in the image data, the transmission status is displayed for each of the plurality of identified objects.

13. A non-transitory computer-readable storage medium storing computer-readable instructions, the computer-readable instructions causing a computer to execute the method of claim 12.

* * * * *